(12) United States Patent
Hunter

(10) Patent No.: US 6,692,783 B2
(45) Date of Patent: Feb. 17, 2004

(54) METHOD AND APPARATUS FOR INTERNALLY SEASONING MEAT PRIOR TO AND DURING COOKING

(76) Inventor: Mary L. Hunter, 252 McKinley St., Gary, IN (US) 46404

( * ) Notice: Subject to any disclaimer, the term of this patent is extended or adjusted under 35 U.S.C. 154(b) by 0 days.

(21) Appl. No.: 09/814,490

(22) Filed: Mar. 21, 2001

(65) Prior Publication Data

US 2002/0178928 A1 Dec. 5, 2002

(51) Int. Cl.⁷ .............................. A23B 4/28; A47J 43/16
(52) U.S. Cl. ....................... 426/281; 426/282; 426/509; 426/523; 99/352; 99/419; 99/449; 99/494; 99/532
(58) Field of Search .......................... 99/345, 352, 419, 99/447, 449, 450, 494, 532; 426/523, 509, 281

(56) References Cited

U.S. PATENT DOCUMENTS

| | | | |
|---|---|---|---|
| 365,895 A | * | 7/1887 | Bailey |
| 725,916 A | * | 4/1903 | Bailey |
| 889,965 A | * | 6/1908 | Rasmussen ................ 99/494 |
| 1,060,440 A | * | 4/1913 | Ehrlich ..................... 99/494 |
| 1,155,139 A | * | 9/1915 | Felker ...................... 99/493 |
| 1,485,253 A | * | 2/1924 | Devlin |
| 2,075,407 A | * | 3/1937 | Schwartzman .............. 53/5 |
| 2,096,726 A | * | 10/1937 | Barton ....................... 53/6 |
| 2,124,700 A | * | 7/1938 | Hartzell ................... 99/494 |
| 2,187,687 A | * | 1/1940 | Harper ..................... 99/494 |
| 2,602,391 A | * | 7/1952 | Pedranti et al. ........... 99/345 |
| 4,129,066 A | * | 12/1978 | Corley ..................... 99/345 |
| 6,125,739 A | * | 10/2000 | Jernigan .................. 99/345 |

* cited by examiner

Primary Examiner—Drew Becker
(74) Attorney, Agent, or Firm—Mary L. Hunter

(57) ABSTRACT

A method and apparatus for distributing the residual flavor from herbs and aromatics into the interior of meat for seasoning prior to and during cooking. The apparatus comprises a reservoir for holding the aromatics in the form of a tapered, split, meat-piercing rod inserted into the interior of meat containing a predetermined amount of aromatics and or herbs. After reaching the desired depth, the devise remains in the meat during the cooking or marinating process. The devise is removed prior to the consumption of the meat leaving behind the residual flavor from the contents of the devise.

6 Claims, 4 Drawing Sheets

METHOD AND APPARATUS FOR INTERNALLY SEASONING MEAT PRIOR TO AND DURING COOKING

BACKGROUND OF THE INVENTION

The present invention relates to a new and improved food seasoning apparatus and methods and more particularly, the invention relates to a device for seasoning internally a meat body and the like by infusing the residual flavor from herbs or aromatics and or seasonings into the body during cooking. The device of the invention is particularly adaptable to shoulder, turkeys, ham, roasts, fish and chickens, and large body of meat in which it is desirable to infuse flavor so that the resulting body when ready for consumption is desirably treated with the flavor from herbs, aromatics, etc. and is more aptly cooked as a result of the heat conducted into the body of meat by the device.

Conventionally, seasonings, tenderizers and preservatives and similar additives in granular or powdered form are sprinkled over food, such as meat, turkey and chicken, a large body of meat or fluid substances are used, but the substances do not penetrate the food body sufficiently to produce a desired uniform effect throughout the consumable body. Methods such as marinating the meat in a solution have proven to be time consuming with limited penetration of the marinade into the body of meat. Moreover the consumable body is sometimes pierced with a knife and then herbs, aromatics and or other seasonings are placed into the body, these methods leave much to be desired in the results obtained and it has been found that flavoring from herbs and aromatics can be infused during cooking.

DESCRIPTION OF THE PRIOR ART

Various prior art devices and methods are known of interest cursorily to the present invention and include U.S. patents as follows:

| | | | |
|---|---|---|---|
| 2,188,976 | 5/38 | Larkin | |
| 2,384,429 | 9/45 | Ball | |
| 2,602,391 | 7/52 | E. T. Pedranti, et al. | 99/532 |
| 2,652,765 | 9/53 | J. L. Risco | 99/345 |
| 4,178,660 | 12/79 | A. A. Oleny, et al | 99/450.8 |
| 5,507,221 | 4/96 | Lagares-Corominas | 99/483 |

Food seasoning devices are known in the prior art. U.S. Pat. Nos. 4,178,660 A. A. Oleny, et al. and 5,507,221 Lagares-Corominas shows an apparatus for distributing additives into a body of meat in which the additive is injected into the body of meat prior to cooking the meat. Furthermore the injection process employs an elongated piston to force the additives out of the device's distributing end located at the tapered end the tubular shaped apparatus. Like much of the prior art Oleny, et al and Lagares-Corominas forcibly inject the meat with an additive prior to cooking, interrupting cooking, or after the meat is cooked. The present invention remains in the meat while cooking. Furthermore, excessive pressure is required to force the additive down the tube into the meat. These problems are overcome by the specific structure of the apparatus of the present invention when operated according to the method of the present invention.

The references to J. L. Risco (2,652,765) and E. T. Pedranti, et al. (2,602,391) show flavoring devices that appear to be pressurized improvements over older devices. The natural cooking process is exploited by the present invention: as the meat cooks, its internal fluids expand initially into voids within the interior of the meat before they (internal fluids) expand (while cooking) to breech the outer-surface of the meat. Consequently, prolonged cooking of a body of meat would cause the body of meat to loose moisture through its outer-surface; hence the term "dry" is commonly associated with overcooked meat. Unlike much of the prior art, the present invention is open at the exposed end being structured to allow the fluids from the cooking meat to expand into the cylinder (via the perforations in the walls of the cylinder) wherein the flavoring constituents are held. As internal fluids expand (while cooking) to breech the outer-surface of the meat the fluids in the cylinder are drawn from the cylinder outwardly into the meat toward the meat's outer-surface. Moreover, the present invention is laterally split open to expose the hollow interior for loading aromatics, etc. and for cleaning. Injecting devices for a different purpose are shown in U.S. Patents to Davis (U.S. Pat. No. 2,161,305), SundhoJm (U.S. Pat. No. 3,286,881), and Moline (U.S. Pat. No. 3,111,222). Davis shows a device for injecting and compacting material into openings in concrete, brick, stone or other masonry, drawing material from a reservoir by means of a tamping rod into a fissure or opening. No means for creating the fissure or opening, however, are apparent: from the device of Davis. SundhoJm and Moline both show dispensing apparatus for applying grease, or the like, using a plunger assembly and nozzle. None of these three patents, however, provides means for penetrating into the interior of meat and none could be expected to properly dispense seasoning materials within the interior of a meat product.

Other patents showing the state of the prior art are the following: U.S. Pat. Nos. 2,188,976—May 31, 1938—Larkin 2,384,429—Sep. 11, 1945—Ball, 5,507,221—Apr., 16 1996—Lagares-Corominas.

Problems encountered in properly seasoning meat for cooking are overcome in the present invention by insuring that seasoning is distributed within the interior of the meat efficiently while cooking without leaving the seasoning constituents within the meat.

None of these patents disclose all of the specific details of the present invention in such a way as to bear upon the patentability of the claims of the invention.

SUMMARY OF THE INVENTION

The embodiment of the apparatus involves opening the devise longitudinally and placing into the opened devise herbs, aromatics and or desired seasonings. The devise is then to be closed in a manner in which the contents are retained inside the devise. The closed end of the devise is contoured as to accommodate it being inserted in a piercing manner or strategically placed into a body of meat. The opposite end is open to allow the flow of heat, and or liquid into and out of the device. The closed end is inserted or strategically placed into the body of meat while the open end is not fully inserted into the body of meat as to be left exposed at or above the meat's surface (at the side or the end). The meat is then cooked. While cooking, the fluids within the body of meat and or fluids outside of the body of meat (with access to the devices exposed open end) mingle with the contents of the device and flow back into the meat producing the desired seasoning or process. After cooking the device is withdrawn from the consumable body by pulling on the handle at the exposed end of the device until the entire device is free.

The invention thus relates to a basting device for consumable bodies and serving to distribute flavor into meat or similar consumable bodies during the normal cooking process for purposes of augmenting the taste, cooking, and processing the body for consumption.

An object and advantage of the present invention is to provide a new and improved method, device, and apparatus which can be readily used to introduce a desirable flavoring, tenderizing or preservative compound or fluid into a food, meat, or other consumable body, whether fish or fowl.

Another object of the invention is to provide a device having a hollow probe or tube through which intended amounts and in which the distribution can be selected so that the seasonings are added to a portion of the consumable body.

Still another object of the invention is to provide a device of the type indicated in which allows the user to regulate the amount and type of flavor that will be discharged upon the operation of the device according to the invention.

Another and still additional object of the invention is to provide a device that can be readily disassembled sufficiently and easily for cleaning, washing, and that can then be reassembled quickly and easily for use prior to or during any stages of cooking of the consumable body.

Other objects of the invention are to provide a Marinating Stick which is relatively inexpensive to manufacture and sell and wherein there is provided a novel and improved construction and arrangement of parts.

These, together with other objects and advantages which will become subsequently apparent reside in the details of construction and operation as more fully hereinafter described and claimed, reference being had to the accompanying drawings forming a part hereof and wherein like numerals refer to like parts throughout.

DETAILED DESCRIPTION OF THE PREFERRED EMBODIMENT

Figure 1:
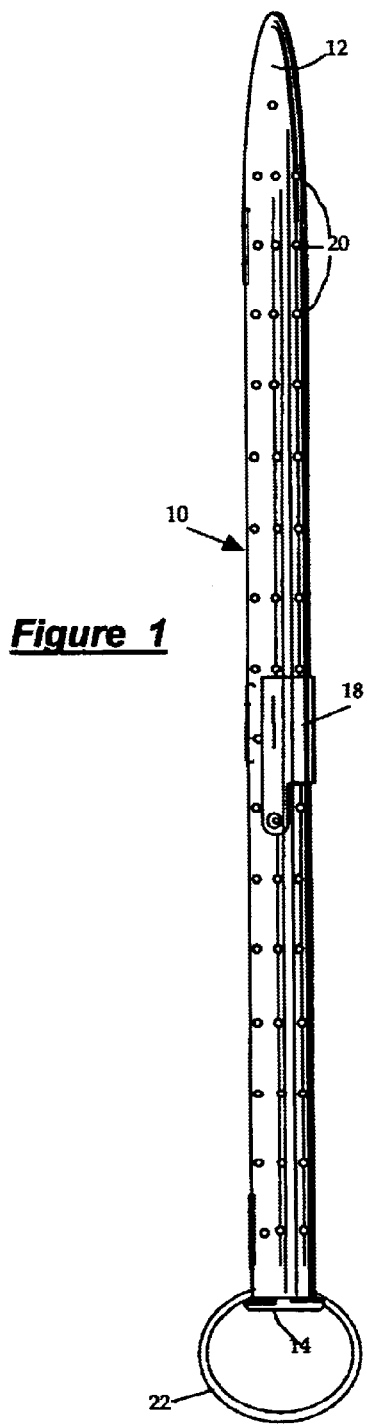
FIG. 1 is a front plan view of the Marinating Stick according to a preferred embodiment of the invention.
Figure 1A:
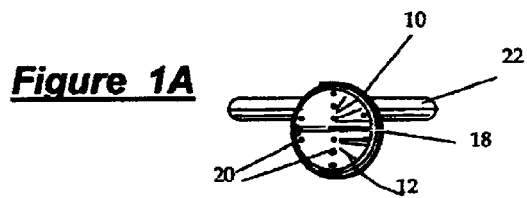
Figure 1B:
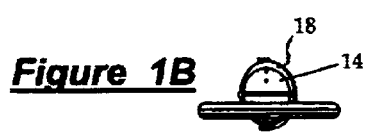
Figure 2:
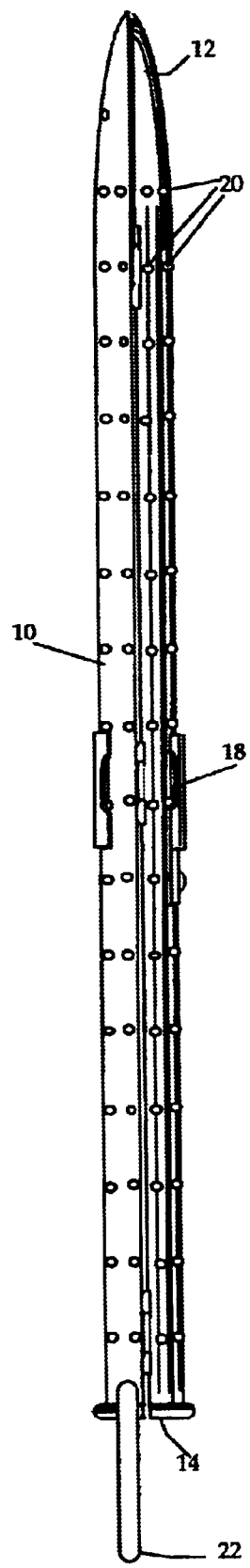
FIG. 2 is side plan view of the Marinating Stick in which the split aspect of the hollow tube is evident.
Figure 3:
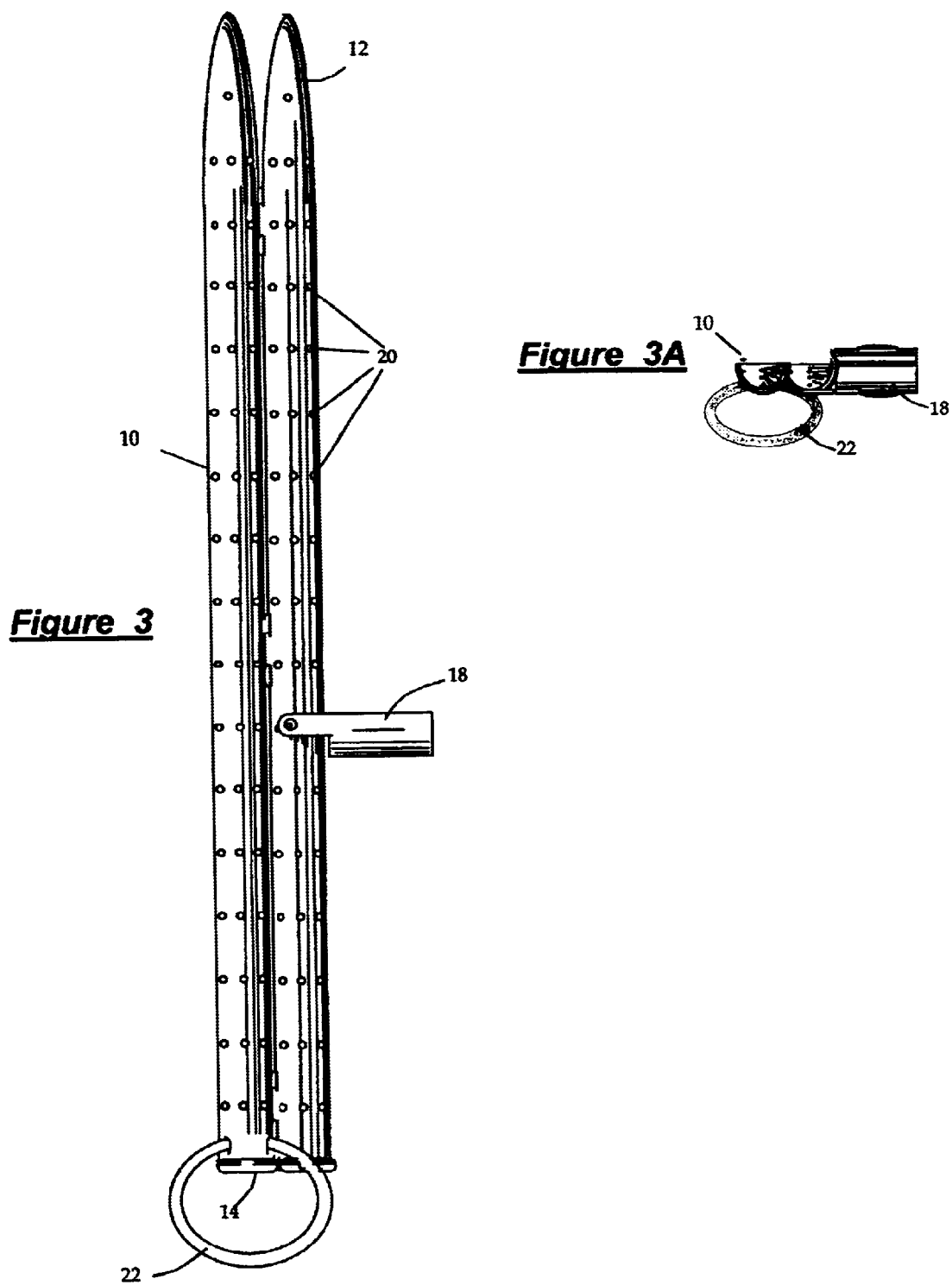
FIG. 3 is an exterior view of the Marinating Stick in its open position also illustrating various components forming the Marinating Stick of the present invention.
Figure 4:
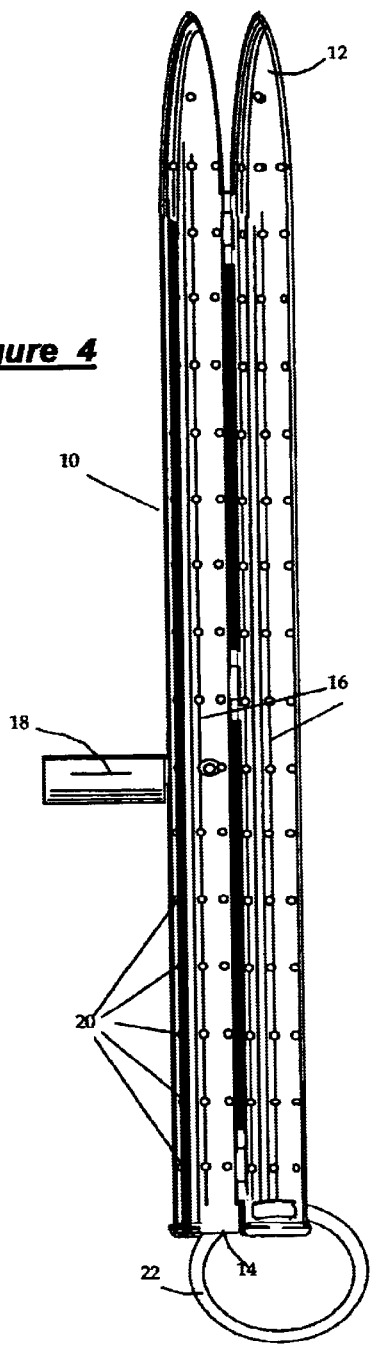
FIG. 4 is an interior view of the Marinating Stick in its open position also illustrating various components forming the Marinating Stick of the present invention.
Figure 4A:
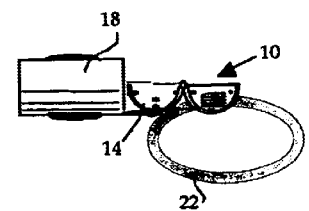

Referring now to the drawings, the basic idea is an elongated hollow "spear" or "arrow" or "stick" (10) that is pressed into a mass of meat (e.g. a roast). The hollow stick (10) has a pointed, closed end (12), and the other end (14) is preferably open and the "stick" (10) is split and can be opened longitudinally. See FIGS. 3, 3A, 4 and 4A. When opened, cut-up herbs, such as garlic, and various aromatics are inserted into the interior (16) and then the tubular unit (10) is closed as a shown in FIGS. 1, 1A, 1B, and 2. A fastener clip (18) releasably locks the tube (10) in the closed position and the tube (10) is provided with a large number of spaced apart holes (20) into its interior (16). The closed and filled unit (10) is then inserted into the (raw) meat and both are placed in the oven (or spit, or what-have-you) to cook. During cooking, the juices of the meat soak through the holes (20) and the flavors of the herbs migrate into the meat. One advantage of the invention is that it allows the entire stick (10) to be removed after cooking, taking with it the wilted pieces of herbs and aromatics. It also aids in cooking the interior of the meat by conducting heat into the interior. The stick (10) includes a pull ring (22) for assisting in the removal of the stick (10) from the meat."

The invention of the Marinating Stick provides food flavor of a consumable product or meats or similar food to the desire of the user of the Marinating Stick device. It is intended that the Marinating Stick can use, whether chopped, crushed or otherwise particulated, solid, dried or fresh herbs seasonings can be inserted into the hollow cavity of the Marinating Stick. The parts can be made of any suitable material and in different shapes or sizes as desired or required.

It is to be understood that the present invention is not limited to any specific material or flavor and for example, the material used to produce the residual flavoring can be solid or of varying types or consistency. In FIGS. 1, 2, 3, and 4 it is to be understood that the length or size thereof can be of any desired dimension. The foregoing is considered as illustrative only of the principles of the invention. Further, since numerous modifications and changes will readily occur to those skilled in the art, it is not desired to limit the invention to the exact instruction and operation shown and described, and accordingly, all suitable modifications and equivalencies may be resorted to, falling within the scope of the invention.

What is claimed is:

1. A flavor distribution device for internally seasoning a body of meat, the device comprising:

an elongated member comprising a pair of half-members separated longitudinally along a first pair of longitudinal edges and pivotally attached along the opposite pair of longitudinal edges thereof, a cavity defined between the half-members when the half-members are in a closed position, and spaced-apart holes extending through each of the half-members and into the cavity;

a pointed, closed end defined at a first longitudinal end of the elongated member when the half-members are in the closed position;

an opening defined at an oppositely disposed second longitudinal end of the elongated member when the half-members are in the closed position; and a fastener clip along the first pair of longitudinal edges configured for releasably locking the half-members in the closed position.

2. A flavor distribution device according to claim 1, further comprising a ring attached to the elongated member, the ring being configured for forcibly removing the flavor distribution device from the body of meat.

3. A method for internally seasoning a body of meat, the method comprising the steps of:

providing a flavor distribution device comprising an elongate member comprising a pair of half-members separated longitudinally alone a first pair of longitudinal edges and pivotally attached along the opposite pair of longitudinal edges thereof, having a cavity therein and spaced-apart holes extending into the cavity;

a pointed, closed end defined at a first longitudinal end of the elongated member when the half-members are in the closed position;

an opening defined at an oppositely disposed second longitudinal end of the elongated member when the half-members are in the closed position;

a fastener clip along the first pair of longitudinal edges configured for releasably locking the half-members in the closed position;

placing seasonings inside the cavity of the flavor distribution device; inserting the flavor distribution device into the body of meat; and then cooking the body of meat so that juices from the body of meat enter the cavity of the flavor distribution device through the holes and contact the seasonings within the cavity, whereby the body of meat is seasoned with the seasonings.

4. A method according to claim 3, wherein after the inserting step, the open end of the elongated member remains outside of the body of meat.

5. A method according to claim 3, further comprising the step of removing the flavor distribution device from the body of meat after the cooking step, and then removing the seasonings from the cavity of the elongated member.

6. A method according to claim 5, wherein the removing step is performed by grasping and pulling a ring attached to an end of the flavor distribution device protruding from the body of meat.

\* \* \* \* \*